Figure 1:
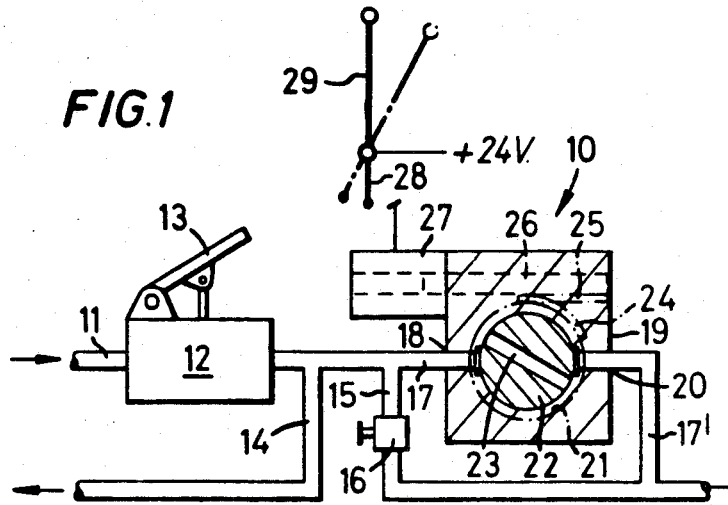

United States Patent [19]

Steel

[11] Patent Number: 4,623,199
[45] Date of Patent: Nov. 18, 1986

[54] FRONT BRAKE CONTROL

[75] Inventor: James Steel, Newcastle Upon Tyne, England

[73] Assignee: Ogden Electronics Ltd., Yorkshire, England

[21] Appl. No.: 247,012

[22] Filed: Mar. 24, 1981

[51] Int. Cl.$^4$ ............................................. B60T 13/00
[52] U.S. Cl. ....................................... 303/6 R; 303/2; 303/15; 192/4 A
[58] Field of Search ........................ 303/6, 7, 9, 13, 15, 303/18, 25, 48, 50, 52, 56, 2, 3, 84, 89; 192/4 C, 4 A, 4 R, 8 R; 251/309, 304, 30; 188/353, 152, 349

[56] References Cited

U.S. PATENT DOCUMENTS

| | | | |
|---|---|---|---|
| 3,061,380 | 10/1962 | Hale | 303/6 R |
| 3,255,837 | 6/1966 | Wolf | 303/13 |
| 3,276,551 | 10/1966 | Buletti et al. | 303/13 |
| 3,285,672 | 11/1966 | Avrea | 303/13 X |
| 3,543,891 | 12/1970 | Mathers | 192/4 C |
| 3,592,315 | 7/1971 | Lewis | 303/7 X |
| 3,893,698 | 7/1975 | Fontaine | 303/89 |
| 3,913,700 | 10/1975 | James | 192/4 C X |
| 3,957,315 | 5/1976 | Cummins et al. | 303/13 X |
| 3,974,899 | 8/1976 | Mita et al. | 192/3 M |

FOREIGN PATENT DOCUMENTS 2604600  6/1977  Fed. Rep. of Germany .

Primary Examiner—Douglas C. Butler
Attorney, Agent, or Firm—Cushman, Darby & Cushman

[57] ABSTRACT

Apparatus for controlling supply of air to front brakes in an air brake system of a truck when a manually operable valve (16) is operated to inhibit flow of air to the front brakes comprises a by-pass loop (17, 17') including an electrically operable valve (19). The valve is operated when a switch (28) is closed on moving a gear selection lever (29) to a position to select reverse gear.

2 Claims, 2 Drawing Figures

FRONT BRAKE CONTROL

DESCRIPTION

This invention relates to brake control of motor vehicles.

It is known to provide motor vehicles, such as heavy trucks, with means for inhibiting supply of working fluid to front brakes of the vehicles. Such inhibiting means is generally in the form of a manually operable control member and is provided for safety reasons enabling a driver to operate the control member when a vehicle is to be driven forwardly so that, on operation of the brake system of the vehicle, only the rear brakes are operated thereby avoiding any possibility of the front brakes locking and causing an accident.

A disadvantage of providing such a control member is that, when a truck is reversing to deposit a load, ground to the rear of the truck is often less firm than ground below the front wheels of the truck and it is desirable to apply front brakes in addition to the rear brakes to ensure controlled reversal of the truck. The disadvantage would be overcome if drivers were to remember to disengage the control member prior to reversal of a truck so that, when the brake system of the truck is operated, the front brakes are operated in addition to the rear brakes, but it has been found that drivers generally fail to do so.

According to the present invention, there is provided apparatus for controlling supply of fluid in a brake system of a vehicle comprising a first conduit for supplying the fluid to brake means for a wheel of a vehicle, inhibiting means for inhibiting flow of the fluid in said first conduit, a second conduit for supplying the fluid to the brake means and control means for controlling flow of fluid in said second conduit, the arrangement being such that, when the inhibiting means inhibits flow of the fluid in said first conduit and the control means is operated, the fluid is supplied to said brake means through said second conduit.

In this specification the term 'fluid' includes fluid in a gaseous state or in a liquid state The control means may be operable in response to movement of a control member of the vehicle.

The control means may be operable in response to movement of a gear selection lever of a vehicle.

The control means may comprise an electrically operable valve member.

The valve member may be contained in an electrical circuit which also includes a switch operable in response to movement of the lever.

The switch may be operable when the lever is moved to a position to select reverse gear of the vehicle.

Following is a description, by way of example, only and with reference to the accompanying drawings, of one method of carrying the invention into effect.

Figure 2:
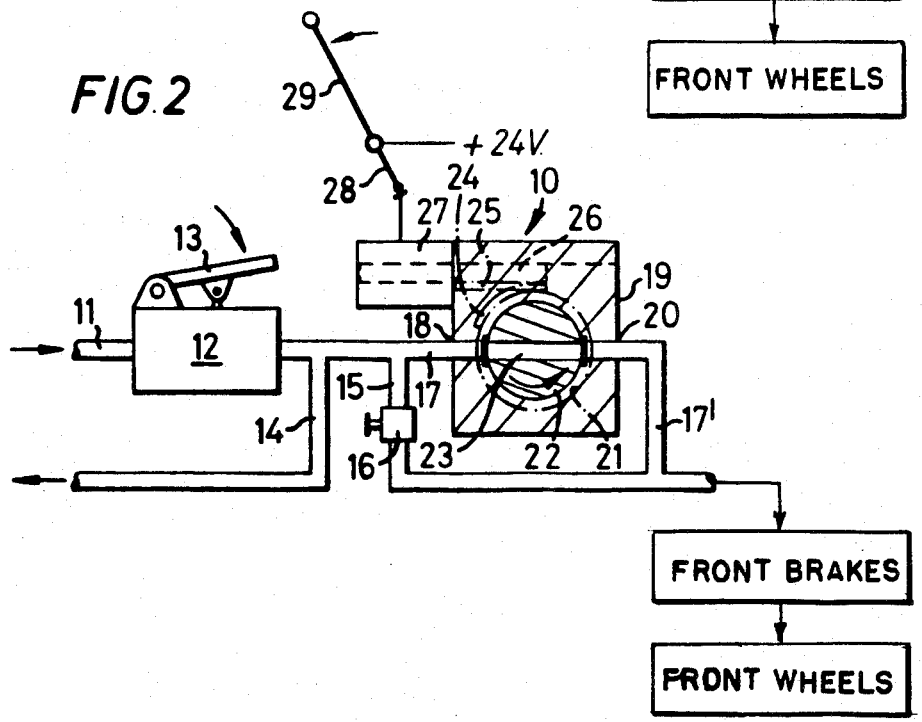

In the drawings:

FIG. 1 is a diagrammatic representation, shown partly in cross-section, of an embodiment of the invention when in an inoperative condition and, FIG. 2 is a view similar to FIG. 1 showing the apparatus when in an operative condition.

Referring now to FIG. 1 of the drawings, there is shown apparatus 10 for controlling supply of air in an air brake system of a truck (not shown).

The brake system includes a conduit 11 for supplying air under pressure to front and rear brakes of the truck. The conduit 11 is connected to a valve 12 which is operable by means of a brake pedal 13. An outlet of valve 12 is connected to a conduit 14, which directs air from the valve 12 to rear brakes of the truck, and to a conduit 15, which directs air from the valve 12 to front brakes of the truck. The conduit 15 includes a manually operable valve 16 arranged, when in an operative position, to inhibit flow of air from the valve 12 to the front brakes of the truck and, when in an inoperative position, to permit flow of air to the front brakes. The conduit 15 is provided with an extended portion 17 in communication with the conduit 17 upstream of the valve 16. The extended portion 17 enters into an inlet 18 of a rotary valve 19.

The valve 19 has an outlet 20 in which is received an end portion of a second extended portion 17' of the conduit 17. The second extended portion 17' is in communication with the conduit 17 downstream of the valve 16.

The rotary valve 19 includes a cylindrical chamber 21 with which the inlet 18 and the outlet 20 are in communication and are located at opposite ends respectively of a diameter of the chamber 21. The chamber 21 has located therein a rotary disc member 22 having a passageway 23 extending diametrically therethrough. The rotary member 22 is provided with an arcuate gear 24 which engages with a rack 25 provided on an elongate member 26 integral with the armature (not shown) of a solenoid 27. The solenoid 27 is connected in an electrical circuit including a switch 28 operable by a gear lever 29 of the truck when the gear lever is moved from a 'neutral' position to a position to select reverse gear of the truck. The arrangement is such that, in a de-energised condition of the solenoid 27, the rotary member 22 is located relative to the chamber 21 with the central longitudinal axis of the passageway 23 disposed at an angle to an axis extending through the inlet 18 and the outlet 20 of the valve 19 and, in an energised condition of the solenoid 27, the central longitudinal axis of the passageway 23 is co-axial with the axis extending through the inlet 18 and the outlet 20 of the valve 19.

When the gear lever 29 of the vehicle is in a neutral position, as shown in full lines in FIG. 1, or in a 'forward' position to select a forward gear of the truck, as shown in chain dotted lines in FIG. 1, the switch 28 is open and the solenoid 27 is in a de-energised condition. A driver of the vehicle may, if desired, operate the valve 16 to inhibit supply of air through the conduit 15 so that, when the brake system is operated on depression of the brake pedal 13, air will be directed only through the conduit 14 to the rear brakes.

When, however, reverse gear is selected by moving the gear lever 29 in a reverse direction, as shown in FIG. 2, the switch 28 is closed thereby connecting the solenoid 27 to a source of electrical power, In consequence, energisation of the solenoid 27 is effected resulting in the rotary member 22 rotating in the chamber 21 in an anticlockwise direction of FIG. 1, due to interengagement of the arcuate gear 24 and the rack 25. The extent of rotation of the rotary member 22 is completed when the central longitudinal axis of the passageway 23 is co-axial with an axis extending through the inlet 18 and the outlet 20 of the valve 19, as shown in FIG. 2. In this manner, the valve 16 is by-passed and, when the brake pedal 13 is operated, supply of air is directed not only through the conduit 14 to the rear brakes of the truck but also through the extended portion 17 of the conduit 15, the passageway 23 of the rotary member 22 of the valve 19 and the second extended portion 17' of the conduit 15 to the front brakes of the truck.

When the gear lever 29 is returned to the neutral position, as shown in FIG. 1, the switch 28 is opened and the solenoid 27 is de-energised with a result that the rotary member 22 is rotated in the chamber 21 to the position shown in FIG. 1 and supply of air to the front brakes through the extended portions 17 and 17' of the conduit 15 is cut off.

It will be appreciated that a truck provided with apparatus in accordance with the present invention, when reversing to a location at which a load in a skip of the truck is to be deposited, will have air supplied to front brakes thereof on operation of the brake pedal 13 and, in consequence, the front wheels of the truck will be braked. It will be also appreciated that such operation of the front brakes of the truck will be effected even if the driver fails to operate a manually operable valve to permit air of the brake system to be supplied to the front brakes.

I claim:

1. Apparatus for controlling the supply of fluid to a braking system of a vehicle, said vehicle having a front wheel and manually controllable motive selection means for selecting forward and reverse drive of said vehicle, and said braking system including front brake means for braking said front wheel when said fluid is supplied to said front brake means through at least one of first and second conduits, said apparatus further comprising:

means for selectively controlling flow of said fluid in said second conduit in response to operation of said selection means so that said fluid is supplied through said second conduit to said front brake means only when said selection means is operated to select reverse drive of said vehicle.

2. A vehicle braking control system for front wheels of a vehicle which is selectively operable in forward and reverse directions, said system comprising:

a first conduit (11) for passing brake-actuating fluid flow therethrough;

a manually operated braking valve (12) serially disposed in said first conduit for normally controlling vehicle brake actuation by controlling fluid flow through said first conduit;

a second conduit (15) in fluid connection with said braking valve and the front wheel brakes of said vehicle;

a manually operated inhibition valve (16) serially connected with said second conduit for inhibiting fluid flow to/from said front brakes when actuated;

a third conduit (17) also in fluid connection with said braking valve and the front wheel brakes of said vehicle and bypassing said inhibition valve;

a normally closed bypass valve (19) serially connected with said third conduit for bypassing fluid flow to/from said front brakes around said inhibition valve whenever said bypass valve is actuated to an open condition; and means for automatically actuating said bypass valve to an open condition whenever said vehicle is operable in reverse direction.

* * * * *